Patented Oct. 3, 1922.

1,430,877

UNITED STATES PATENT OFFICE.

GILBERT ELLIS BAILEY AND ALLAN E. SEDGWICK, OF LOS ANGELES, CALIFORNIA.

PROCESS FOR EXTRACTING LITHIUM AND POTASSIUM FROM LITHIUM-POTASSIUM ORES AND ALSO FORMING POTASSIUM ALUM FROM SUCH ORES.

No Drawing.   Application filed February 14, 1921.   Serial No. 444,769.

*To all whom it may concern:*

Be it known that we, GILBERT ELLIS BAILEY and ALLAN E. SEDGWICK, both citizens of the United States, and both residing in the city of Los Angeles, county of Los Angeles, and State of California, have invented a new and useful Process for Extracting Lithium and Potassium from Lithium-Potassium Ores and Also Forming Potassium Alum from Such Ores, of which the following is a specification.

Our invention relates to improvements in the process for the treatment of lithium-potassium bearing ores, such as lepidolite, and has for its main object the formation and recovery of potassium sulphate, lithium carbonate and potassium alum, the secondary object being to cheapen and simplify the operation and obtain a higher per cent of extraction than has heretofore been possible.

We are aware that in the prior art the first step of the present process, or the use of potassium sulphate, has in some cases been practiced, the great difficulty however being that the first step in such processes used potassium sulphate in excess and high temperatures were used, and the processes became clumsily involved causing loss of time and great expense and resulted in a low per cent of extraction.

Broadly, the present process comprises five distinct steps as follows:

1st. The lithium ore, or lepidolite, containing potassium, lithium, aluminum, and silicon, with various other elements in small quantities is heated in the presence of potassium sulphate.

2nd. The soft clinker resulting from heat treatment is leached with hot water by means of which the potassium and lithium contents are dissolved as a solution or liquid.

3rd. This solution is treated with ammonia, either as a gas or a solution, causing a precipitation of most of the potassium sulplate while the lithium content remains in solution. The potassium content is removed by filtering.

4th. The filtrate carrying the lithium in solution and a small content of potassium sulphate is then treated with carbon dioxide resulting in the formation of lithium carbonate. The small content of potassium sulphate brought down in this step may be later eliminated through the regular routine of chemical refinement.

5th. The soft clinker from step two is treated with sulphuric acid. Water is added and the alum is leached out and recovered by crystallization. More specifically in the operation of the present process the lithium ore is ground exceedingly fine as the fineness of the ore is most important and then intimately mixed with the potassium sulphate in the proportion of about one-third potassium sulphate to two-thirds of the ore by weight. Formerly the practice was to use an excess of two or three times as much potassium sulphate as of the ore and subject the mixture to high temperature. This intimate mixture of the potassium sulphate and ore is charged into an adequate roasting furnace where the temperature can be closely controlled. It is then heated to about 1500 degrees F. We avoid using an excess of the potassium sulphate and high temperatures, as we have discovered that better results are obtained with medium temperatures and smaller amount of potassium sulphate.

When the mixed charge contains a large amount of potassium sulphate and is heated to such high temperatures as at 1800 to 2200 degrees F., undesirable compounds are formed. On the other hand, when low temperatures, say as low as 1400 or 1500 degrees F., or lower, are used with only about one-third as much potassium sulphate as ore by weight, we obtain over ninety per cent extraction of lithium content. Potassium and lithium belong to the same chemical group and are miscible with one another. We use the potassium sulphate as a solvent to dissolve out the lithium contents of the ore, the temperature being simply a stimulant to the activity of the solute and makes the very fine particles of the ore softer so that they will soak up the solvent. The potassium sulphate is held in intimate contact with the ore for a sufficient length of time to dissolve out the lithium content uncontaminated with alumina or other compounds. In this way we avoid any roasting that would form silicates. It should also be remembered that lithium is volatile at high temperatures and this loss is prevented by the present process.

The clinker should be soft and friable, not hard and vitreous as in the prior art. This clinker is ground to facilitate leaching and is charged into a sand vat and the contents of lithium and potassium salts dissolved out with hot water, leaving the alumina and the silicates and other insolubles varying according to the nature of the ore.

The lithium-potassium solution thus obtained is treated with ammonia gas until the potassium contents are precipitated. The precipitate is filtered off and the potassium sulphate recovered. The filtrate which is slightly alkaline from the last step is placed in a proper vessel and treated with carbon dioxide converting the lithium salts into carbonate of lithium, which may be recovered by the usual chemical processes.

The waste portions of the solutions of these various steps that still contain some potassium sulphate may be used in the fifth step and the potassium recovered from them as potassium alum. The ground clinkers containing all the potassium which had not been recovered by leaching and which contains the aluminum in the ore is treated with sulphuric acid. The water is added, or in its place the waste liquid referred to above, resulting in the formation of the double sulphate of aluminum and potassium or potassium alum, which is recovered by crystallization.

It is pointed out that in this process much potassium sulphate is recovered which can be used in the continued operation of the process, or sold. Should the potassium alum be in greater demand commercially, all the alumina can be converted into alum.

It is understood that while certain means have been mentioned by which the process may be carried out, various other means might be adopted which would show equally well or possibly better results. It is here stated that since the present process must be adapted to ores having a varied content of potassium, lithium and aluminum, and in view of the fact that other elements and conditions affect the various steps in the process, the exact treatment and proportions of the mix charged into the furnace and other like conditions throughout the process may be varied without departing from the spirit of the invention as claimed, the spirit of the invention being that the process must be carried on below temperatures which may form silicates of the elements to be recovered or volatilize the lithium or potassium.

We claim as our invention:

1. A process for the extraction of lithium and potassium from lithium potassium ores consisting of intimately mixing the fine ore with sulphate of potassium, of heating the mixture sufficiently for the sulphate of potassium to dissolve out the lithium contents, of leaching the resulting clinker from the heat treatment, of precipitating the sulphate of potassium and separating it from the lithium by adding ammonia gas, and by converting the lithium into lithium carbonate by the use of carbon dioxide.

2. A process for recovering the potassium sulphate used and in addition all of the potassium in the lithium potassium ores by intimately mixing the fine ore with potassium sulphate, of heating the mixture sufficiently for the sulphate of potassium added to dissolve out some of the potassium in the ore together with the lithium contents, of leaching the resulting clinker from the heat treatment, of precipitating the potassium sulphate by ammonia gas and recovering the potassium sulphate used together with additional potassium from the ore.

3. A process for the extraction of lithium and potassium from lithium-potassium ores, consisting of mixing such ore with potassium sulfate, and heating such mixture at a temperature not exceeding 1500 degrees Fahrenheit.

4. A process for the extraction of lithium and potassium from lithium-potassium ores, consisting of heating the ore at a temperature not exceeding 1500 degrees Fahrenheit, with potassium sulfate in the proportion of three parts of ore to one of sulfate.

In testimony whereof, we have hereunto set our hands and seals at Los Angeles, California, this 25th day of January, 1921.

GILBERT ELLIS BAILEY.
ALLAN E. SEDGWICK.